United States Patent [19]

Gutleber

[11] Patent Number: 4,475,186
[45] Date of Patent: Oct. 2, 1984

[54] MULTIPLEXED NOISE CODED SWITCHING SYSTEM

[75] Inventor: Frank S. Gutleber, Little Silver, N.J.

[73] Assignee: The United States of America as represented by the Secretary of the Army, Washington, D.C.

[21] Appl. No.: 402,476

[22] Filed: Jul. 28, 1982

[51] Int. Cl.³ ............................................. H03K 13/02
[52] U.S. Cl. ...................................... 370/18; 370/21; 370/54; 340/346; 340/347 DD
[58] Field of Search ...................... 370/18–22, 370/53, 104, 116, 54, 69.1, 77, 85; 375/25, 1, 38, 96, 102–104; 340/348, 349, 346, 347 DD; 455/306; 364/604, 725, 728, 819, 826

[56] References Cited

U.S. PATENT DOCUMENTS

| | | |
|---|---|---|
| 3,461,451 | 8/1969 | Gutleber . |
| 3,519,746 | 7/1970 | Gutleber . |
| 3,634,765 | 1/1972 | Gutleber . |
| 3,908,088 | 9/1975 | Gutleber ............................. 370/104 |
| 4,149,030 | 4/1979 | Foreman ............................... 370/85 |
| 4,293,953 | 10/1981 | Gutleber ............................... 375/25 |
| 4,425,562 | 1/1984 | De Niet ............................... 370/18 |

OTHER PUBLICATIONS

Weik, Martin H., *Communications Standard Dictionary*, Van Nostrand Reinhold Company, 1983, p. 56, 200.

*Primary Examiner*—Robert L. Griffin
*Assistant Examiner*—Albert W. Watkins
*Attorney, Agent, or Firm*—Anthony T. Lane; Sheldon Kanars; Jeremiah G. Murray

[57] ABSTRACT

A switching system for performing line to line or group to group switching of communication signals modulated by multiplexed noise codes. The noise codes comprise a subclass or set of multiplexed noise codes consisting of code mate pairs which provide an impulse autocorrelation function when detected and furthermore crosscorrelate to zero at a time when the code mate pairs compress to an impulse providing thereby orthogonal operation, meaning that there is no mutual interference between any of the input/output lines when the signals are translated thereon concurrently. Plural sets of noise code generators and code selectors are coupled to predetermined ones of a plurality of sets of matched filter detectors and code selectors in accordance with a switching algorithm which sets selected code selectors to the same code mate pairs so that a specific signal applied to a predetermined input line and thereafter coupled to modulation means connected to one set of code generators is directed to a predetermined output line that is connected to a matched filter decoder pair matched to the input code.

21 Claims, 2 Drawing Figures

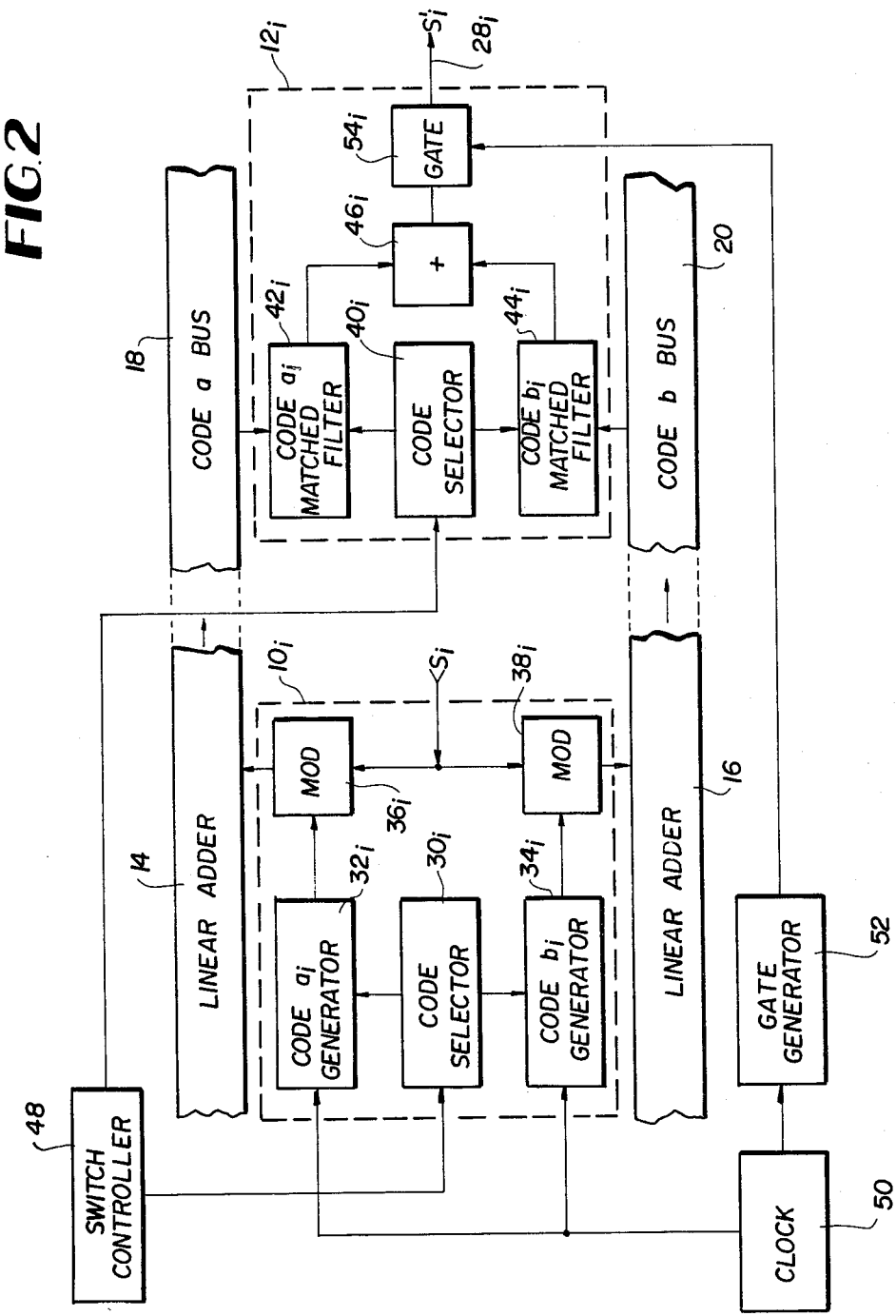

MULTIPLEXED NOISE CODED SWITCHING SYSTEM

The invention described herein may be manufactured, used and licensed by or for the Government for governmental purposes without the payment to me of any royalties thereon or therefor.

CROSS REFERENCE TO RELATED APPLICATION

This application is related to another application filed in the name of the present inventor, and comprises U.S. Ser. No. 407,409 (CERCOM D-2058), entitled, "Orthogonal Code Division Multiple Access Communication System", filed on Aug. 12, 1982. This application is referenced inasmuch as the same type of noise codes are employed in both inventions.

FIELD OF THE INVENTION

This invention relates generally to signal switching systems and more particularly to a switching system which performs line to line or group to group switching for signals modulated by multiplexed noise codes.

BACKGROUND OF THE INVENTION

Communications systems utilizing noise coded signals are well known and are particularly desirable because they exhibit immunity against self interference and jamming. In particular, one class of noise codes are known wherein pairs of coded signals termed "code mates" have autocorrelation functions so that when they are detected and the resultant detected outputs are linearly added, there is provided an impulse autocorrelation function meaning that there is an impulse output at a given time and a zero output at all other times. Such codes and systems utilizing such codes are typically shown and described in U.S. Pat. No. 3,461,451, entitled, "Code Generator To Produce Permutations Of Code Mates", which issued to F. S. Gutleber, the present inventor, on Aug. 12, 1969; U.S. Pat. No. 3,519,746, entitled, "Means And Method To Obtain An Impulse Autocorrelation Function", which issued to F. S. Gutleber on July 7, 1970; and U.S. Pat. No. 3,634,765, entitled, "System To Provide An Impulse Autocorrelation Function . . . ", which issued to F. S. Gutleber on Jan. 11, 1972. The teachings of these patents are meant to be incorporated herein by reference, since they provide a basis for the subject invention which will be described subsequently.

Prior art approaches to switching systems for performing line to line or group to group switching between multiple users have resorted to the use of frequency filters, time gates or space division switching. Such apparatus as a result has been found to be relatively complex, bulky and vulnerable to noise interference, cross talk, unauthorized interception and jamming.

SUMMARY OF THE INVENTION

Accordingly, it is an object of the present invention to provide an improvement in secure communications switching systems.

Another object of the present invention is to provide an improved switching system capable of automatically accommodating digital and/or analog signals.

Still another object of the invention is to provide an improved switching system for secure communications systems that automatically accommodate both digital and analog signals and which operates with no interference between multiple users while completely eliminating the unauthorized interception of messages therebetween.

Accordingly, these and other objects are achieved by means of a switching system utilizing multiplexed noise codes which compress to a lobeless impulse upon detection and which additionally have a characteristic whereby different codes of a selected subset crosscorrelate to zero at a time when they exhibit an autocorrelation impulse function. The system includes a plurality of input lines coupled to respective noise code mate generators and a plurality of output lines respectively coupled to noise code pulse compressors. The code generators and the pulse compressors operate in accordance with a switching algorithm that sets an input line code generator and an output line pulse compressor to the same code mate pair which automatically directs or translates the specific signal applied to an input line to a selected output line that is matched to the input code.

BRIEF DESCRIPTION OF THE DRAWINGS

FIG. 2 is a functional block diagram further illustrative of the embodiment shown in FIG. 1.

DETAILED DESCRIPTION OF THE PREFERRED EMBODIMENT

Figure 1:
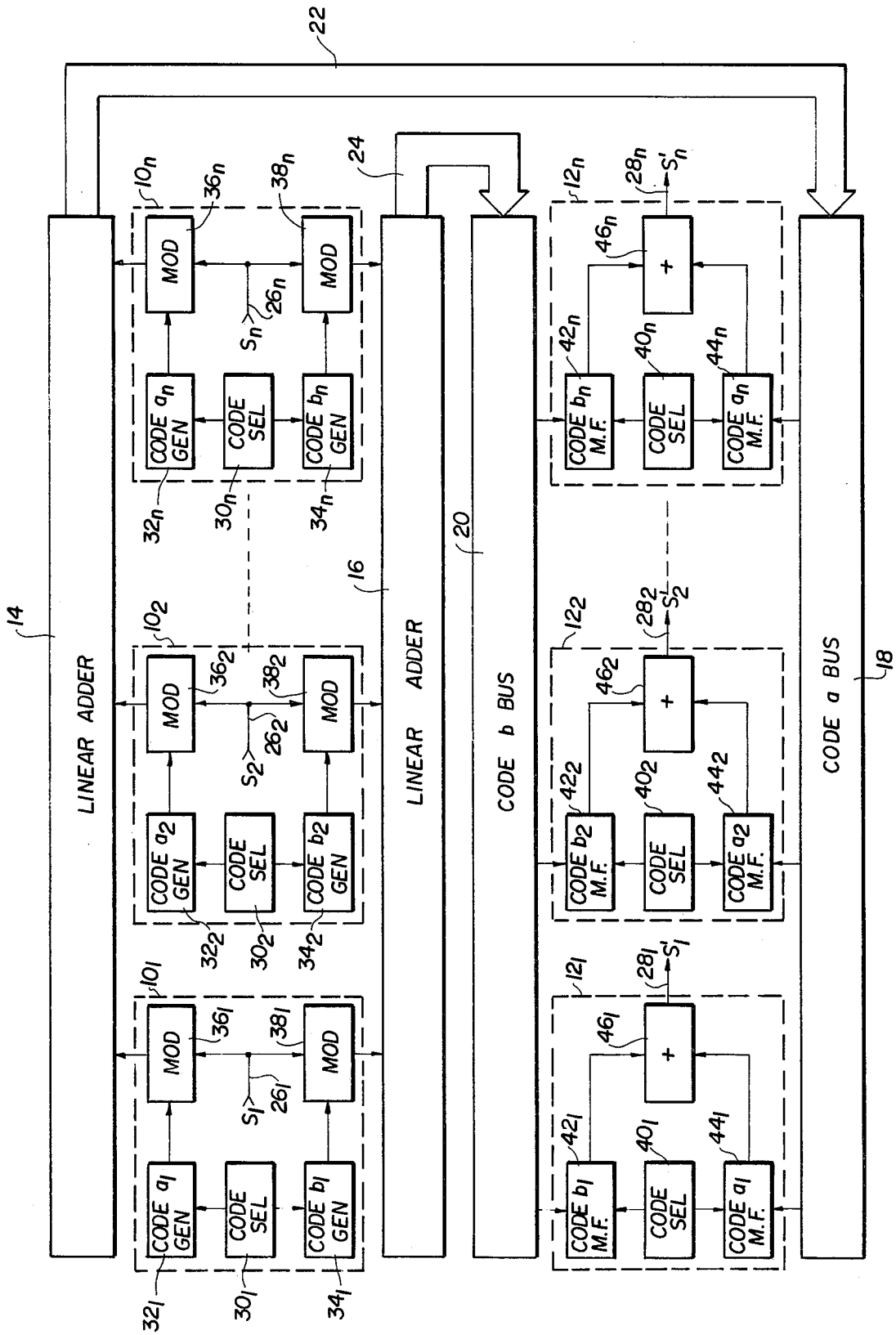
FIG. 1 is a functional block diagram illustrative of the preferred embodiment of the invention.

Referring now to the drawings and more particularly to FIG. 1, shown thereat in block diagrammatic form is a multiplexed noise coded switching system in accordance with the subject invention which is comprised of a plurality of input circuits $10_1, 10_2 \ldots 10_n$ and a corresponding number of output circuits $12_1, 12_2 \ldots 12_n$. The input units commonly couple to a pair of linear adders 14 and 16 used for signal multiplxing and which respectively connect to a pair of multiplexed noise code busses 18 and 20 commonly coupled to the output circuits $12_1, 12_2 \ldots 12_n$. Interconnection between the adders 14 and 16 and the noise code busses 18 and 20 is further made by a pair of signal lines 22 and 24. Each of the n input circuits $10_1 \ldots 10_n$ include a respective input line $26_1, 26_2 \ldots 26_n$ which is adapted to receive an input signal $S_1, S_2 \ldots S_n$. In a like manner, each of the output circuits $12_1, 12_2 \ldots 12_n$ include a respective output line $28_1, 28_2 \ldots 28_n$ which are adapted to separately output the signals $S'_1, S'_2 \ldots S'_n$.

Selective signal coupling between one or more input circuits $10_1 \ldots 10_n$ and one or more output circuits $12_1 \ldots 12_n$ is achieved by utilizing multiplexed noise codes of a particular type, to be described, to modulate a particular input signal (S) of the signals $S_1 \ldots S_n$ which is then coupled to at least one output circuit having a detector or decoder which is matched to the noise code of the particular input circuit. The noise codes are of the well known general type of noise codes shown and described in the aforementioned U.S. Pat. Nos. 3,461,451; 3,519,746; and 3,634,765 and which consist of code mate pairs that possess an impulse autocorrelation function upon detection. The present invention, however, utilizes a specific subclass or set of these noise codes which have code mate pairs which exhibit a crosscorrelation function equal to zero at a time when the code mate pairs compress to an impulse. While spurious lobes may exist whose rms value has an amplitude that is down by at least the square root of the code sequence length, i.e. the time—bandwidth product, the absence of any correlation value in the same compressed time interval for all codes of this latter type enables the system as shown in FIG. 1 to operate orthogonally, i.e. without any interference between any of the input/output lines, while using different noise codes for the input/output circuits $10_1 \ldots 10_n$ and $12_1 \ldots 12_n$.

Accordingly, each of the input circuits $10_1, 10_2 \ldots 10_n$ respectively include a noise code selector $30_1, 30_2 \ldots 30_n$ which are adapted to selectively control each of the desired noise code outputs of code mate pair generators $32_1, 32_2$ and $32_n$ and $34_1, 34_2 \ldots 34_n$ so that each input circuit is adapted to generate mutually different code mate pairs. As shown, code generators $32_1$ and $34_1$ are adapted to generate code mate pairs $a_1$ and $b_1$ whereas code generators $32_2$ and $34_2$ are adapted to generate code mate pairs $a_2$ and $b_2$, respectively. Each of the input circuits $10_1, 10_2 \ldots 10_n$ additionally include a pair of modulators $36_1$ and $38_1, 36_2$ and $38_2 \ldots 36_n$ and $38_n$. It can be seen, for example, that code generators $32_1$ and $34_1$ are coupled to modulators $36_1$ and $38_1$, respectively, and operate such that code mate $a_1$ modulates the input signal $S_1$ in modulator $36_1$ which is coupled to the linear adder 14 while code mate $b_1$ modulates the input signal $S_1$ via modulator $38_1$ whose output is coupled to the linear adder 16.

The input signal $S_1$ modulated by the generated code mate pair $a_1$ and $b_1$ will transfer only to a selected output line $28_1, 28_2 \ldots 28_n$ coupled to output circuits $12_1, 12_2 \ldots 12_n$ whose noise code detectors are matched so that they are responsive to codes $a_1$ and $b_1$. Accordingly, the output circuits $12_1, 12_2 \ldots 12_n$ include respective code selectors $40_1, 40_2 \ldots 40_n$ which are coupled to decoders in the form of matched filters $42_1, 44_1, 42_2$ and $44_2 \ldots 42_n$ and $44_n$. Additionally as shown, the various matched filters for code mates $a_1, b_1, a_2, b_2 \ldots a_n$ and $b_n$ couple to respective linear adders $46_1, 46_2$ and $46_n$ wherein resultant compressed impulse signal outputs $S'_1, S'_2 \ldots S'_n$ appear in a well known manner on lines $28_1, 28_2 \ldots 28_n$.

Referring now to FIG. 2, the ith input and output circuits $10_i$ and $12_i$ are shown respectively coupled to the linear adders 14 and 16 and the busses 18 and 20 which additionally translate all codes $a$ and $b$ of different code mate pairs generated in the system shown in FIG. 1. What is additionally shown in FIG. 2 is a switch controller 48 coupled to the code selectors $30_i$ and $40_i$ for matching the codes $a_i$ and $b_i$ generated and detected by code generators $32_i$ and $34_i$ and the matched filters $42_i$ and $44_i$. Also a clock 50 is shown coupled to the $a_i$ and $b_i$ code mate pair generators $32_i$ and $34_i$. Its purpose is to start the generated codes $a_i$ and $b_i$ as well as all other codes at the same time. The clock 50 additionally is coupled to a gate generator 52 which is adapted to trigger a gate $54_i$ at a time the detected code mate pairs $a_i$ and $b_i$ compress to an impulse output signal $S_i$ upon being added linearly by the linear adder $46_i$.

The code mate pairs $a_i$ and $b_i$ are of the general type disclosed in the aforementioned U.S. Pat. Nos. 3,461,451; 3,519,746; 3,634,765 but comprise a subclass thereof having an additional characteristic which permits different code mate pairs to be selectively switched concurrently between input and output lines $26_1 \ldots 26_n$ and $28_1 \ldots 28_n$ simultaneously without mutual interference therebetween. In order to fully understand the operation of the subject invention, it becomes necessary to describe the specific type or subclass of code mate pairs utilized.

As noted above, multiplexed noise codes are codes formed with mate pairs that compress to an impulse autocorrelation function upon detection. The autocorrelation function of two codes forming a mate pair must be of equal magnitude and opposite sense for all values of time outside of the main lobe. Expressed mathematically, for two code mate pairs a and b, $$\phi_{ai}(\Gamma) = -\phi_{bi}(\Gamma) \text{ for all } \Gamma \neq 0$$

where
$\phi_{ai}(\Gamma)$ is the autocorrelation function of code $a_i$,
$\phi_{bi}(\Gamma)$ is the autocorrelation function of code $b_i$, and
$\Gamma_0$ is the location of the main lobe.

When the two codes $a_i$ and $b_i$ meet this requirement, then the simple linear sum $\phi_{Ti}(\Gamma)$ of their orthogonally multiplexed outputs from matched filters $42_i$ and $44_i$ coupled to busses 18 and 20 result in compressing the composite code structure into a single impulse at time $\Gamma=0$.

As an illustration and for clarification, consider the use of the following mate code pair in the switching system as a result of the operation of code selector $30_i$ of FIG. 2. For code $a_i = 1000$ and code $b_i = 1011$, the code selector $40_i$ would compress these codes by autocorrelation as follows.

The output $\phi_{ai}(\Gamma)$ of the filter $42_i$, matched to code $a_i$ by providing an inversion sequence of 0001 where $0=0°$ and $1=180°$ phase reversal, is generated graphically below as,

| bit time slot | 1 | 2 | 3 | 4 | 5 | 6 | 7 |
|---|---|---|---|---|---|---|---|
| Inv. Seq. | 0 0 0 1 | 1 0 0 | 0 1 0 | 0 0 1 | 0 0 0 | 0 | |
| $\phi_{ai}(\Gamma) =$ | 1 | . | 0 | $0^4$ | 0 | . | 1 | where $0 = +$ polarity bit
$1 = -$ polarity bit and the exponent is the amplitude of the 0 or 1 bits.

The output $\phi_{bi}(\Gamma)$ of the filter $44_i$ matched to code $b_i$ by providing an inversion sequence of 1101, is graphically illustrated as,

| bit time slot | 1 | 2 | 3 | 4 | 5 | 6 | 7 |
|---|---|---|---|---|---|---|---|
| Inv. Seq. | 1 1 0 1 | 0 1 0 | 1 0 1 | 0 0 0 | 0 1 0 | 1 0 | 0 |
| $\phi_{bi}(\Gamma) =$ | 0 | . | 1 | $0^4$ | 1 | . | 0 |

The linear sum $\phi_i(f)$ of the two matched filter outputs results in

| bit time slot | 1 | 2 | 3 | 4 | 5 | 6 | 7 |
|---|---|---|---|---|---|---|---|
| $\phi_{ai}(\tau)$ | 1 | . | 0 | $0^4$ | 0 | . | 1 |
| $\phi_{bi}(\tau)$ | 0 | . | 1 | $0^4$ | 1 | . | 0 |
| $\phi_i(\tau)$ | . | . | . | $0^8$ | . | . | . |

$\uparrow \tau = 0$

As noted above, orthogonal subsets of multiplexed noise codes exists whereby code pairs of the same subset have a crosscorrelation value of zero at $\Gamma=0$ which results in no interference (zero crosstalk) occurring between any of the codes when the code mate pairs compress to an impulse. Two specific sets of codes possessing the required crosscorrelation characteristic are shown in tables 1 and 2 where the codes identified in Table 1 form a subclass of 4 bit multiplexed codes and the codes identified in Table 2 form a subclass of 8 bit multiplexed codes.

TABLE 1

| Code Mate Pair No. | Code a subset | Code b subset |
|---|---|---|
| 1 | 1 0 0 0 | 1 0 1 1 |
| 2 | 0 0 1 0 | 1 1 1 0 |
| 3 | 0 1 0 0 | 0 1 1 1 |
| 4 | 0 0 0 1 | 1 1 0 1 |
| 5 | 1 0 0 0 | 0 1 0 0 |
| 6 | 0 0 1 0 | 0 0 0 1 |
| 7 | 0 1 0 0 | 1 0 0 0 |
| 8 | 0 0 0 1 | 0 0 1 0 |

TABLE 2

| Code Mate Pair No. | Code a subset | Code b subset |
|---|---|---|
| 1 | 1 0 1 0 0 0 1 1 | 1 0 0 1 0 0 0 0 |
| 2 | 1 0 0 0 0 1 0 0 | 1 0 0 0 1 0 1 1 |
| 3 | 0 1 0 0 1 0 0 0 | 1 0 1 1 1 0 0 0 |
| 4 | 0 0 0 1 0 0 1 0 | 0 0 0 1 1 1 0 1 |
| 5 | 1 1 0 1 0 0 0 1 | 1 1 0 1 1 1 1 0 |
| 6 | 1 1 1 1 0 1 1 0 | 0 0 1 1 1 0 1 0 |
| 7 | 0 1 0 0 0 1 1 1 | 0 1 0 0 1 0 0 0 |
| 8 | 0 1 1 0 1 0 0 | 1 0 0 0 0 1 0 0 |
| 9 | 0 1 1 1 1 0 1 1 | 1 0 0 0 1 0 1 1 |
| 10 | 1 1 1 0 1 1 0 1 | 0 0 0 1 1 1 0 1 |
| 11 | 0 0 1 0 1 1 1 0 | 1 1 0 1 1 1 1 0 |
| 12 | 1 0 1 1 1 0 0 0 | 0 1 0 0 1 0 0 0 |
| 13 | 0 0 1 0 0 0 0 1 | 0 0 1 0 1 1 1 0 |
| 14 | 1 1 1 0 0 0 1 0 | 1 1 1 0 1 1 0 1 |
| 15 | 0 0 1 1 0 1 0 1 | 1 1 1 1 1 0 0 1 |
| 16 | 1 0 0 1 1 1 1 1 | 1 0 1 0 1 1 0 0 |

Demonstrating that there would be no interference occurring between any of the input/output lines $26_1 \ldots 26_n$ and $28_1 \ldots 28_n$ utilizing any of the code mate pairs of Tables 1 and 2 requires establishing that the crosscorrelation between any two or more codes identified in either tables is zero at $\Gamma = 0$.

Consider first the codes listed in Table 1. The crosscorrelation function of the codes $a_1, a_2$ and $b_1, b_2$ for code mate pairs 1 and 2 at $\Gamma = 0$ is readily determined as follows:

For code a,

| $a_1$ | | 1 | 0 | 0 | 0 |
|---|---|---|---|---|---|
| $a_2$ | X | 0 | 0 | 1 | 0 |
| | $\Sigma = -$ | $+$ | $-$ | $+$ | $= \phi_{a2\,a1}(0)$ | where:
$1 \times 0 = -$
$0 \times 1 = -$
$1 \times 1 = +$
$0 \times 0 = +$

For code b,

| $b_1$ | | 1 | 0 | 1 | 1 |
|---|---|---|---|---|---|
| $b_2$ | X | 1 | 1 | 1 | 0 |
| | $\Sigma = +$ | $-$ | $+$ | $-$ | $= 0 = \phi_{b2\,b1}(0)$ |

And the composite crosscorrelation function at $\Gamma = 0$ becomes:

$$\phi_{21}(0) = \phi_{a2\,a1}(0) + \phi_{b2\,b1}(0)$$
$$= 0 + 0 = 0$$

where
$\phi_{a2\,a1}(0) =$ crosscorrelation function value between codes $a_2$ and $a_1$ at $\tau = 0$
$\phi_{b2\,b1}(0) =$ crosscorrelation function value between codes $b_1$ and $b_2$ at $\tau = 0$
$\phi_{21}(0) =$ total crosscorrelation function value between multiplexed code pairs 2 and 1 at $\tau = 0$ In a like manner, the crosscorrelation function value at $\Gamma = 0$ was calculated for all 28 possible combinations. The results are shown in Appendix A appearing at the end of the specification and verifies that the crosscorrelation values between any 2 or more codes of the same subset is zero and accordingly the codes are orthogonal or totally non-interfering at $\Gamma = 0$.

As a further clarification, consider the situation where eight input and output lines $26_1 \ldots 26_8$ and $28_1 \ldots 28_8$ are being utilized at the same time with each input/output line pair employing and matched to a different code mate pair of the set shown in Table 1. For the input/output circuits $10_1$ and $12_1$ responsive to code mate pair No. 1, the potential interference of codes 2 through 8 would be as follows:

The interference signal $\Sigma_a$ present at linear adder 14 of FIG. 1 and coupled to code a bus 18 is graphically illustrated below as,

| input circuit #2 | 0 | 0 | 1 | 0 |
|---|---|---|---|---|
| input circuit #3 | 0 | 1 | 0 | 0 |
| input circuit #4 | 0 | 0 | 0 | 1 |
| input circuit #5 | 1 | 0 | 0 | 0 |
| input circuit #6 | 0 | 0 | 1 | 0 |
| input circuit #7 | 0 | 1 | 0 | 0 |
| input circuit #8 | 0 | 0 | 0 | 1 |
| $\Sigma_a =$ | $0^5$ | $0^3$ | $0^3$ | $0^3$ |

The interference signal $\Sigma_b$ present at linear adder 16 and coupled to code b bus 20 would be,

| input circuit #2 | 1 | 1 | 1 | 0 |
|---|---|---|---|---|
| input circuit #3 | 0 | 1 | 1 | 1 |
| input circuit #4 | 1 | 1 | 0 | 1 |
| input circuit #5 | 0 | 1 | 0 | 0 |
| input circuit #6 | 0 | 0 | 0 | 1 |
| input circuit #7 | 1 | 0 | 0 | 0 |
| input circuit #8 | 0 | 0 | 1 | 0 |
| $\Sigma_b =$ | 0 | 1 | 0 | 0 | where the exponent indicates the amplitude.

The output $\phi_{a1}$ and $\phi_{b1}$ of the matched filters $42_1$ and $44_1$ of output unit $12_1$ matched to code pair No. 1 would be as follows:

Code a matched filter $42_1$ responds to $\Sigma_a$ and provides an inversion sequence of 0001 to output $\phi_{a1}(\Gamma)$ in the following manner.

| bit time slot | 1 | 2 | 3 | 4 | 5 | 6 | 7 |
|---|---|---|---|---|---|---|---|
| Inv. Seq. | 0 | $0^5$ | $0^3$ | $0^3$ | $0^3$ | | |
| | 0 | | $0^5$ | $0^3$ | $0^3$ | $0^3$ | |
| | 0 | | | $0^5$ | $0^3$ | $0^3$ | $0^3$ |
| | 1 | | | | $1^5$ | $1^3$ | $1^3$ | $1^3$ |
| $\phi_{a1}(\Gamma) =$ | | $0^5$ | $0^8$ | $0^{11}$ | $0^4$ | $0^3$ | | $1^3$ |

Code b matched filter $44_1$ responds to $\Sigma_b$ and provides an inversion sequence of 1101 to output $\phi_{b1}(\Gamma)$ as,

| bit time slot | 1 | 2 | 3 | 4 | 5 | 6 | 7 |
|---|---|---|---|---|---|---|---|
| Inv. ⎧ | 1 | 1 | 0 | 1 | 1 | | |
| Seq. ⎨ | 1 | 1 | 0 | 1 | 1 | | |
| | 0 | | 0 | | 1 | 0 | 0 |
| | 1 | | | 1 | 0 | 1 | 1 |
| $\phi_{b1}(\Gamma) =$ | 1 | | 0 | $1^4$ | 0 | | 1 |

And the composite summed output $\phi_{T1}(\Gamma)$ would result in,

| bit time slot | 1 | 2 | 3 | 4 | 5 | 6 | 7 |
|---|---|---|---|---|---|---|---|
| $\phi_{a1}(\tau)$ | $0^5$ | $0^8$ | $0^{11}$ | $0^4$ | $0^3$ | . | $1^3$ |
| $\phi_{b1}(\tau)$ | 1 | . | 0 | $1^4$ | 0 | . | 1 |
| $\phi_{T1}(\tau) =$ | $0^4$ | $0^8$ | $0^{12}$ | $\tau=0\ 0^4$ | | . | $1^4$ |

↑
└── $\tau = 0$

The center or fourth bit time slot corresponds to $\Gamma=0$ and is where all the other selected codes utilized in the system would be totally non-interfering. The interfering energy that is present in the lobes of the compressed signal for $\Gamma\neq 0$ is simply gated out or it causes no interference at all. It is important to note that although this illustrated example used the same amplitude for each signal being switched, the actual amplitudes could all be different and theoretically have any value with the same result. Furthermore, there would be no interference problem present in the proposed concept whether digital, analog or a mix of digital and analog signals are employed.

Therefore, the desired signal $S_1$ (FIG. 1) applied to input line $26_1$ and modulated with code mate pair No. 1 would simply linearly sum with the total input and compress to its peak value of $S'_1=8$ at $\Gamma=0$ which would then appear on output line $28_1$.

When a positive signal $S_1$ is present and modulated by code mate pair No. 1 of Table 1 the composite signal on the code a bus 18 would be.

| $\Sigma_a$ | $0^5$ | $0^3$ | $0^3$ | $0^3$ |
|---|---|---|---|---|
| input circuit #1 | 1 | 0 | 0 | 0 |
| $\Sigma_{Ta} =$ | $0^4$ | $0^4$ | $0^4$ | $0^4$ | while the composite signal at the code b bus (20) would be

| $\Sigma_b$ | 0 | 1 | 0 | 0 |
|---|---|---|---|---|
| input circuit #1 | 1 | 0 | 1 | 1 |
| $\Sigma_{Tb} =$ | . | . | . | . |

The output of the matched filters $42_1$ and $44_1$ for code No. 1 would then be as shown below. For the code a matched filter $41_1$ providing an inversion sequence of 0001, there is provided $\phi_{a1}(\Gamma)$ and illustrated as,

| bit time slot | 1 | 2 | 3 | 4 | 5 | 6 | 7 |
|---|---|---|---|---|---|---|---|
| Inv. ⎧ | 0 | $0^4$ | $0^4$ | $0^4$ | $0^4$ | | |
| Seq. ⎨ | 0 | | $0^4$ | $0^4$ | $0^4$ | $0^4$ | |
| | 0 | | | $0^4$ | $0^4$ | $0^4$ | $0^4$ |
| | 1 | | | $1^4$ | $1^4$ | $1^4$ | $1^4$ |
| $\phi_{a1}(\Gamma) =$ | | $0^4$ | $0^8$ | $0^{12}$ | $0^8$ | $0^4$ | $1^4$ |

└── $\Gamma = 0$

The code b matched filter $44_1$ output would be zero, therefore the composite summed output $\phi_{T1}(\Gamma)$ would result in

| $\phi_{T1}(\tau) =$ | $0^4$ | $0^8$ | $0^{12}$ | $0^8$ | $0^4$ | . | $1^4$ |
|---|---|---|---|---|---|---|---|

↑
└── $\tau = 0$

What is provided on output line $28_1$ is an output $S'_1$ equal to the input that is utilizing code No. 1 with an amplitude 8 times larger. If the input signal is digital using a binary structure of $+1$ and $-1$, then its negative value would simply become $-8$ at the output line.

A similar demonstration for the code mate pairs of Table 2 would reveal identical results. Rather than present the crosscorrelation function values for all of the 66 possible combinations, however, a typical sample situation will be illustrated. This will suffice to demonstrate and clarify that the 8 bit code subset set forth can indeed be utilized for the noise coded switch of this invention and result in zero interference at the output lines.

Referring to Table 2, consider, for example, code mate pair Nos. 5 and 7 being used simultaneously with code mate pair No. 4. For the input/output circuits $10_4$ and $12_4$ that is utilizing code pair No. 4, then the potential interference of code pairs Nos. 5 and 7 would be as follows.

The code a matched filter $42_4$ of output unit $12_4$ would see a signal $\Sigma_{a4}$ which can be graphically illustrated as,

| input circuit #5 | 1 | 1 | 0 | 1 | 0 | 0 | 0 | 1 |
|---|---|---|---|---|---|---|---|---|
| input circuit #7 | 0 | 1 | 0 | 0 | 0 | 1 | 1 | 1 |
| $\Sigma_{a4} =$ | . | $1^2$ | $0^2$ | . | $0^2$ | . | . | $1^2$ |

The code b matched filter $44_4$ would see a signal $\Sigma_{b4}$ as shown below as,

| input circuit #5 | 1 | 1 | 0 | 1 | 1 | 1 | 1 | 0 |
|---|---|---|---|---|---|---|---|---|
| input circuit #7 | 0 | 1 | 0 | 0 | 1 | 0 | 0 | 0 |
| $\Sigma_{b4} =$ | . | $1^2$ | $0^2$ | . | $1^2$ | . | . | $0^2$ |

The output of the matched filters $42_4$ and $44_4$ responsive to code pair No. 4 would be as follows.

Code a matched filter $42_4$ would output $\phi_{a4}(\Gamma)$ as,

| bit time slot | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| | 0 | $1^2$ | $0^2$ | . | $0^2$ | . | . | $1^2$ | | | | | | |
| | 1 | | $0^2$ | $1^2$ | . | $1^2$ | . | . | $0^2$ | | | | | |
| Inv. | 0 | | | $1^2$ | $0^2$ | . | $0^2$ | . | . | $1^2$ | | | | |
| Seq. | 0 | | | | $1^2$ | $0^2$ | . | $0^2$ | . | . | $1^2$ | | | |

-continued

| bit time slot | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 |  |  |  |  | $0^2$ | $1^2$ |  | $1^2$ |  |  | $0^2$ |  |  |  |
| 0 |  |  |  |  |  | $1^2$ | $0^2$ |  | $0^2$ |  |  | $1^2$ |  |  |
| 0 |  |  |  |  |  |  | $1^2$ | $0^2$ |  | $0^2$ |  |  | $1^2$ |  |
| 0 |  |  |  |  |  |  |  | $1^2$ | $0^2$ |  | $0^2$ |  |  | $1^2$ |
| $\phi_{a4}(\Gamma) =$ | $1^2$ | $0^4$ | $1^4$ | $0^2$ | $0^2$ | $1^2$ |  |  | $0^2$ |  | $0^4$ | $1^2$ | $1^2$ | $1^2$ |

Code b matched filter $44_4$ would output a signal $\phi_{b4}(\Gamma)$ shown below as,

| bit time slot | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 1 | $0^2$ | $1^2$ |  | $0^2$ |  |  | $1^2$ |  |  |  |  |  |  |  |
| 0 |  | $1^2$ | $0^2$ |  | $1^2$ |  |  | $0^2$ |  |  |  |  |  |  |
| Inv. 1 |  |  | $0^2$ | $1^2$ |  | $0^2$ |  |  | $1^2$ |  |  |  |  |  |
| Seq. 1 |  |  |  | $0^2$ | $1^2$ |  | $0^2$ |  |  | $1^2$ |  |  |  |  |
| 1 |  |  |  |  | $0^2$ | $1^2$ |  | $0^2$ |  |  | $1^2$ |  |  |  |
| 0 |  |  |  |  |  | $1^2$ | $0^2$ |  | $1^2$ |  |  | $0^2$ |  |  |
| 0 |  |  |  |  |  |  | $1^2$ | $0^2$ |  | $1^2$ |  |  | $0^2$ |  |
| 0 |  |  |  |  |  |  |  | $1^2$ | $0^2$ |  | $1^2$ |  |  | $0^2$ |
| $\phi_{b4}(\Gamma) =$ | $0^2$ | $1^4$ | $0^4$ | $0^2$ | $1^2$ | $1^2$ |  | $0^4$ | $1^2$ | $1^4$ | $1^4$ | $0^2$ | $0^2$ | $0^2$ |

The composite summed output $\phi_{T4}(\Gamma)$ of the filter matched to code pair No. 4 and provided by the adder $46_4$ is

| $\phi_{a4}(\tau)$ | $1^2$ | $0^4$ | $1^4$ | $0^2$ | $0^2$ | $1^2$ | . | . | $0^2$ | . | $0^4$ | $1^2$ | $1^2$ | $1^2$ |
| $\phi_{b4}(\tau)$ | $0^2$ | $1^4$ | $0^4$ | $0^2$ | $1^2$ | $1^2$ | . | $0^4$ | $1^2$ | $1^4$ | $1^4$ | $1^2$ | $0^2$ | $0^2$ |
| $\phi_{T4}() =$ | . | . | . | $0^4$ | . | $1^4$ | . | $0^4$ | . | $1^4$ | . | . | . | . |

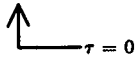
$\tau = 0$ which verifies that there would be no interference from the simultaneous presence of code pairs 5 and 7 at the output of the filter matched to code pair number 4 at $\Gamma=0$.

Although 4 bit and 8 bit code mate pairs have been utilized above, for purposes of illustration, the quantity of available unique noise codes whose crosscorrelation value equals zero at $\Gamma=0$ will be greater than the time-bandwidth product, possibly by a very large factor, for moderate to large time-bandwidth values (i.e. 50 to 1000). The two sets of codes listed in Tables 1 and 2 are both equal to the time-bandwidth product ($T \times B = n =$ no. of code bits) even though the quantity of perfect noise codes that could be generated are somewhat restrictive for a limited 4 bit and 8 bit code pair. As the code bit quantity increases to moderate values, the number of different multiplexed noise codes that can be generated rapidly approaches infinity as a result of the powerful and general expansion rules that have been discovered for the general class of multiplexed noise codes. Accordingly for any application, the required number of code bits will never be greater than the required number of bits switched in a prior art digital switch using gates and, moreover, will be significantly less so that a coded switched system results which is less complex. In addition, very large switch line capacities that would ordinarily be impractical for pure time gate switching, due to bandwidth and bit rate limitations, now become feasible when utilizing coded switching as set forth in this specification. While orthogonal operation has been shown and described, it should also be pointed out that even larger quantities of noise code sets become available for a given application is some degree of non-orthogonal operation is allowed. The performance would be slightly degraded, but this would occur gracefully.

Thus what has been shown and described is a multiplexed noise coded line selection system wherein each selected input/output line utilizes a different unique noise code. This is made possible by the use of multiplexed noise codes having an impulse autocorrelation function and which have the unique property of comprising code subsets whose crosscorrelation value is zero at $\Gamma=0$ which is the time when the autocorrelation function of each specific code pair compresses to an impulse.

An important advantage associated with noise coded switching in accordance with the subject invention is that the noise codes can serve a multi-purpose function that is capable of satisfying the most difficult requirements associated with certain types of communications systems, for example, tactical communications systems. The codes can be utilized to perform the signalling function of a mobile access system with little or no self-interference, provide a large degree of anti-jam protection, enjoy a low probability of intercept and meet communications security requirements while interoperating directly with a multi-channel switching system that automatically switches the code to any required destination point over a trunk line network.

Having shown and described what is at present considered to be the preferred embodiment of the invention, it should be understood that the same has been made by way of illustration and not of limitation and accordingly all modifications, alternations and changes coming within the spirit and scope of the invention are herein meant to be included.

| APPENDIX A |
|---|
| 1 0 0 0     1 0 1 1 |
| 0 1 0 0     1 1 1 0 |
| − − + +  ⊕  + − + −  $= 0 = \phi_{31}(0)$ |
| 1 0 0 0     1 0 1 1 |
| 0 0 0 1     1 1 0 1 |
| − + + −  ⊕  + − − +  $= 0 = \phi_{41}(0)$ |
| 1 0 0 0     1 0 1 1 |
| 1 0 0 0     0 1 0 0 |
| + + + +  ⊕  − − − −  $= 0 = \phi_{51}(0)$ |
| 1 0 0 0     1 0 1 1 |
| 0 0 1 0     0 0 0 1 |

APPENDIX A -continued $$\begin{matrix}-&+&-&+\\1&0&0&0\\0&1&0&0\end{matrix} \oplus \begin{matrix}-&+&-&+\\1&0&1&1\\1&0&0&0\end{matrix} = 0 = \phi_{61}(0)$$

$$\begin{matrix}-&-&+&+\\1&0&0&0\\0&0&0&1\end{matrix} \oplus \begin{matrix}+&+&-&-\\1&0&1&1\\0&0&1&0\end{matrix} = 0 = \phi_{71}(0)$$

$$\begin{matrix}-&+&+&-\\0&0&1&0\\0&1&0&0\end{matrix} \oplus \begin{matrix}-&+&+&-\\1&1&1&0\\0&1&1&1\end{matrix} = 0 = \phi_{81}(0)$$

$$\begin{matrix}+&-&-&+\\0&0&1&0\\0&0&0&1\end{matrix} \oplus \begin{matrix}-&+&+&-\\1&1&1&0\\1&1&0&1\end{matrix} = 0 = \phi_{32}(0)$$

$$\begin{matrix}+&+&-&-\\0&0&1&0\\1&0&0&0\end{matrix} \oplus \begin{matrix}+&+&-&-\\1&1&1&0\\0&1&0&0\end{matrix} = 0 = \phi_{42}(0)$$

$$\begin{matrix}-&+&-&+\\0&0&1&0\\0&0&1&0\end{matrix} \oplus \begin{matrix}-&+&-&+\\1&1&1&0\\0&0&0&1\end{matrix} = 0 = \phi_{52}(0)$$

$$\begin{matrix}+&+&+&+\\0&0&1&0\\0&1&0&0\end{matrix} \oplus \begin{matrix}-&-&-&-\\1&1&1&0\\1&0&0&0\end{matrix} = 0 = \phi_{62}(0)$$

$$\begin{matrix}+&-&-&+\\0&0&1&0\\0&0&0&1\end{matrix} \oplus \begin{matrix}+&-&-&+\\1&1&1&0\\0&0&1&0\end{matrix} = 0 = \phi_{72}(0)$$

$$\begin{matrix}+&+&-&-\\0&1&0&0\\0&0&0&1\end{matrix} \oplus \begin{matrix}-&-&+&+\\0&1&1&1\\1&1&0&1\end{matrix} = 0 = \phi_{82}(0)$$

$$\begin{matrix}+&-&+&-\\0&1&0&0\\1&0&0&0\end{matrix} \oplus \begin{matrix}-&+&-&+\\0&1&1&1\\0&1&0&0\end{matrix} = 0 = \phi_{43}(0)$$

$$\begin{matrix}-&-&+&+\\0&1&0&0\\0&0&1&0\end{matrix} \oplus \begin{matrix}+&+&-&-\\0&1&1&1\\0&0&0&1\end{matrix} = 0 = \phi_{53}(0)$$

$$\begin{matrix}+&-&-&+\\0&1&0&0\\0&1&0&0\end{matrix} \oplus \begin{matrix}+&-&-&+\\0&1&1&1\\1&0&0&0\end{matrix} = 0 = \phi_{63}(0)$$

$$\begin{matrix}+&+&+&+\\0&1&0&0\\0&0&0&1\end{matrix} \oplus \begin{matrix}-&-&-&-\\0&1&1&1\\0&0&1&0\end{matrix} = 0 = \phi_{73}(0)$$

$$\begin{matrix}+&-&+&-\\0&0&0&1\\1&0&0&0\end{matrix} \oplus \begin{matrix}+&-&+&-\\1&1&0&1\\0&1&0&0\end{matrix} = 0 = \phi_{83}(0)$$

$$\begin{matrix}-&+&+&-\\0&0&0&1\\0&0&1&0\end{matrix} \oplus \begin{matrix}-&+&+&-\\1&1&0&1\\0&0&0&1\end{matrix} = 0 = \phi_{54}(0)$$

$$\begin{matrix}+&+&-&-\\0&0&0&1\\0&1&0&0\end{matrix} \oplus \begin{matrix}-&-&+&+\\1&1&0&1\\1&0&0&0\end{matrix} = 0 = \phi_{64}(0)$$

$$\begin{matrix}+&-&+&-\\0&0&0&1\\0&0&0&1\end{matrix} \oplus \begin{matrix}+&-&+&-\\1&1&0&1\\0&0&1&0\end{matrix} = 0 = \phi_{74}(0)$$

$$\begin{matrix}+&+&+&+\\1&0&0&0\\0&0&1&0\end{matrix} \oplus \begin{matrix}-&-&-&-\\0&1&0&0\\0&0&0&1\end{matrix} = 0 = \phi_{84}(0)$$

$$\begin{matrix}-&+&-&+\\1&0&0&0\\0&1&0&0\end{matrix} \oplus \begin{matrix}+&-&+&-\\0&1&0&0\\1&0&0&0\end{matrix} = 0 = \phi_{65}(0)$$

$$\begin{matrix}-&-&+&+\\1&0&0&0\\0&0&0&1\end{matrix} \oplus \begin{matrix}-&-&+&+\\0&1&0&0\\0&0&1&0\end{matrix} = 0 = \phi_{75}(0)$$

$$\begin{matrix}-&+&+&-\\0&0&1&0\\0&1&0&0\end{matrix} \oplus \begin{matrix}+&-&-&+\\0&0&0&1\\1&0&0&0\end{matrix} = 0 = \phi_{85}(0)$$

$$\begin{matrix}+&-&-&+\\0&0&1&0\\0&0&0&1\end{matrix} \oplus \begin{matrix}-&+&+&-\\0&0&0&1\\0&0&1&0\end{matrix} = 0 = \phi_{76}(0)$$

$$\begin{matrix}+&+&-&-\\0&1&0&0\\0&0&0&1\end{matrix} \oplus \begin{matrix}+&+&-&-\\1&0&0&0\\0&0&1&0\end{matrix} = 0 = \phi_{86}(0)$$

$$\begin{matrix}+&-&+&-\end{matrix} \oplus \begin{matrix}-&+&-&+\end{matrix} = 0 = \phi_{87}(0)$$

I claim:

1. A multiplexed noise coded switching system for making selective interconnection between a plurality of signal input lines and a plurality of signal output lines, comprising in combination:

input circuit means respectively coupled to each of said input lines and wherein each of said input circuit means includes means for generating a respective multiplexed noise code formed with code mate pairs having autocorrelation functions which upon detection compress to an impulse and additionally having crosscorrelation functions equal to zero at a time when said code mate pairs compress to an impulse;

means for modulating a respective input signal with a selected code mate pair, output circuit means respectively coupled to each of said output lines and wherein each of said output circuit means includes detector means responsive to a selected code mate pair modulating an input signal applied to said input lines for detecting and compressing said code mate pair to an impulse output signal which is applied to the respective output line, means for commonly connecting all of said input circuit means with all of said output circuit means, and whereby any input signal modulated by a generated code mate pair will only translate to a selected output line whose detector means are matched to said code mate pair while non-interfering with all other output lines.

2. The switching system as defined by claim 1 wherein each of said input circuit means includes means for generating mutually different multiplexed noise codes.

3. The switching system as defined by claim 2 wherein said noise code generating means comprises first and second noise code generates each generating one code of a code mate pair, and said modulating means comprises first and second signal modulators respectively coupled to said first and second noise code generators and commonly coupled to the respective input.

4. The switching system as defined by claim 3 wherein said detector means comprises autocorrelation detector means.

5. The switching system as defined by claim 4 wherein said autocorrelation detector means comprises first and second noise code compressor means each matched to a different one of said first and second code generators, and adder means coupled to said first and second code compressor means for linearly adding the compressed output thereof to provide said impulse output signal.

6. The switching system as defined by claim 5 wherein said first and second code compressor means are comprised of matched filters.

7. The switching system as defined by claim 5 and additionally including code selector means coupled to said first and second noise code generators for producing a desired code mate pair, and additionally including code selector means coupled to said first and second noise code compressor means for matching the code of said first code generator to said first code compressor means and the code of said second code generator to said second code compressor means.

8. The switching system as defined by claim 5 wherein said connecting means comprises a first linear adder coupled to all of said first signal modulators, a second linear adder coupled to all of said second signal modulators, a first noise code bus commonly connected between said first linear adder and all of said first code compressor means, and a second noise code bus commonly connected between said second linear adder and all of said second code compressor means.

9. The switching system as defined by claim 5 and additionally including timing means coupled between said input circuit means and said output circuit means for starting all of the generated noise codes and for detecting all of said noise codes concurrently.

10. The switching system as defined by claim 9 wherein said timing means includes a clock signal generator coupled to all said first and second noise code generators and a respective signal output gate coupled to all said adder means coupled to said first and second noise code compressor means and energized in accordance with the operation of said clock signal generator.

11. The switching system as defined by claim 10 and additionally including gate generator means coupled between said clock signal generator and each signal output gate.

12. The switching system as defined by claim 1 wherein said code mate pairs are comprised of multi-bit binary digital codes.

13. A method of selectively switching a plurality of electrical signals between a plurality of signal input lines and a plurality of signal output lines while providing orthogonal operation therebetween, comprising the steps of:
generating a plurality of different multiplexed noise codes comprising code mate pairs having autocorrelation functions which upon detection compress to an impulse and additionally having crosscorrelation functions equal to zero at a time when said code mates compress to an impulse;
modulating each input signal applied to a respective input line with a different code mate pair;
translating the modulated signals to a plurality of code detectors;
selectively matching said code detectors to predetermined different code mate pairs of said different noise codes;
detecting and compressing each different code mate pair to an impulse signal in a code detector matched to a particular code mate pair to provide a respective output signal for each input signal; and
applying each output signal to a respective output line, whereby any input signal modulated by a particular generated code mate pair will only translate to a selected output line whose code detector is matched to that code mate pair while non-interfering with all modulated signals.

14. The method as defined by claim 13 wherein said step of translating comprises translating all modulated signals of one code of said different code mate pairs on a common signal channel and translating all modulated signals of the code of said different code mate pairs on another common signal channel.

15. The method as defined by claim 14 wherein said step of generating said plurality of different code mate pairs comprises generating each code of a code mate pair separately under the control of a code selector.

16. The method as defined by claim 14 wherein said step of detecting each different code mate pair comprises detecting each code of a code mate pair separately and said step of compressing comprises adding the respective detected code mate pairs together.

17. The method as defined by claim 16 where said step of detecting each code of a code mate pair separately is under the control of code selector for selectively matching a specific modulating code mate pair coupled to a predetermined input line to a specific code detector coupled to a predetermined output line.

18. The method as defined by claim 16 wherein said step of separately detecting each code of a code mate pair comprises matched filter detecting and said step of adding the detected code mate pairs together comprises linearly adding the respective detected code mate pairs together.

19. The method as defined by claim 14 wherein said step of generating said plurality of different multiplexed noise codes comprises generating all said different code mate pairs concurrently.

20. The method as defined by claim 19 and wherein said step of detecting and compressing comprises detecting and compressing all said different code mate pairs concurrently.

21. The method as defined by claim 13 wherein said code mate pairs are comprised of multi-bit binary digital codes.

* * * * *